April 4, 1967    T. P. HEUCHLING ET AL    3,312,842
RECIPROCATING ACTUATOR

Filed April 30, 1964      4 Sheets-Sheet 1

INVENTORS
Theodore P. Heuchling
Richard E. Kronauer
BY
Attorney

April 4, 1967 T. P. HEUCHLING ET AL 3,312,842
RECIPROCATING ACTUATOR
Filed April 30, 1964 4 Sheets-Sheet 2

INVENTORS
Theodore P. Heuchling
Richard E. Kronauer
BY
Attorney

April 4, 1967 T. P. HEUCHLING ET AL 3,312,842
RECIPROCATING ACTUATOR
Filed April 30, 1964 4 Sheets-Sheet 3

INVENTORS
Theodore P. Heuchling
BY Richard E. Kronauer

Attorney

United States Patent Office 3,312,842
Patented Apr. 4, 1967

3,312,842
RECIPROCATING ACTUATOR
Theodore P. Heuchling, Concord, and Richard E. Kronauer, Harvard, Mass., assignors to Arthur D. Little, Inc., Cambridge, Mass., a corporation of Massachusetts
Filed Apr. 30, 1964, Ser. No. 363,789
8 Claims. (Cl. 310—17)

This invention relates to an actuating means, and more particularly to a direct linear actuator, which if desired, can be rotated simultaneously to impart a reciprocating and rotating motion to a load.

There are many instances where it would be desirable to have available a direct linear actuator which could serve either as a motor or as a generator. For example, in the textile industry it is necessary to provide means for moving the shuttles in the looms in a reciprocating motion, e.g. at a rate of about 200 oscillations per minute. In some forms of small self-contained apparatus such as compressors, expansion engines, and refrigerators, it is essential that means be provided to drive one or more pistons directly without a crank. As another use for such a linear actuator, we may cite the use of apparatus in the development of A.C. current directly from a free piston gas generator. It would also be desirable to have such an actuator which could be coupled to rotating means to produce synchronized reciprocating and rotating motion. This in turn would permit the design and use of slide valve systems, particularly in the construction of apparatus where a piston must act or be acted upon by an expansible fluid.

Some attempts have been made to design and construct such direct linear actuators, but the difficulties which have been encountered have generally limited the performance of such apparatus and have discouraged their practical application. Among these difficulties may be listed large flux leakages, failure to recognize and balance forces, and an inability to make the actuator run for a full stroke over an extended period of time.

Thus there is a real need for a direct linear actuator which can serve either as an electric motor or a generator and which can, if desired, be coupled with rotating means to give a synchronized rotating reciprocating motion to a load.

It is therefore the primary object of this invention to provide a direct linear electromagnetic actuator which can be excited by either alternating current or pulsed direct current. It is another object of this invention to produce such an apparatus which is capable of delivering reciprocating motion to a load, the load being a combination of elastic, inertial and dissipative effects. It is another object of this invention to provide such an actuator which may serve either as a motor, in which case net work is delivered by the actuator to the load, as in a reciprocating compressor; or as a generator, in which case net work is delivered by the load to the actuator as in a reciprocating expansion engine. It is yet another object of this invention to provide a direct linear actuator so designed that the electric current need be carried only by the stationary member and not by the moving reciprocating member. It is another object to provide such an actuator in which the structure of the moving member is designed to impede the development of eddy currents consequent to its motion. Another object of this invention is to provide such an actuator which can readily be adapted to produce a predetermined movement with respect to the pulsed electrical current and with respect to the characteristics of the load on the moving member.

It is another primary objective of this invention to provide a direct linear actuator which is capable of achieving rotation, as well as reciprocation of the moving member relative to the stationary member. It is yet another object of this invention to provide such an apparatus which is so designed as to impede the development of eddy currents which might result from both the reciprocating and the rotating motions and to use the phase relationship developed between rotation and reciprocation as means for timing and operating valve systems. It is yet another object to provide such apparatus which is capable of developing in its rotation fluid bearing films to support the moving member and its load. Other objects of the invention will in part be obvious and will in part be apparent hereinafter.

The invention accordingly comprises the features of construction combinations of elements, and arrangement of parts which will be exemplified in the constructions hereinafter set forth and the scope of the invention will be indicated in the claims.

For a fuller understanding of the nature and objects of the invention, reference should be had to the following detailed description taken in connection with the accompanying drawings in which.

The linear actuator of this invention overcomes many of the difficulties previously encountered in an attempt to provide direct reciprocating motion. It does this through the use of a novel combination of features which include developing force by variations in reluctance as the position of the moving member varies relative to the stationary member, the construction of the stationary and moving members in laminated form to impede development of unwanted eddy currents, the shaping of the gap between the stationary and moving members to establish a gradient of reluctance at each point in the stroke to fit the character of the load, and the operation of the moving member along a line relative to the stationary member which corresponds to the loci of maximum reluctance, thus achieving zero reluctance gradients and therefore zero force normal to the desired line of motion.

Figure 1:
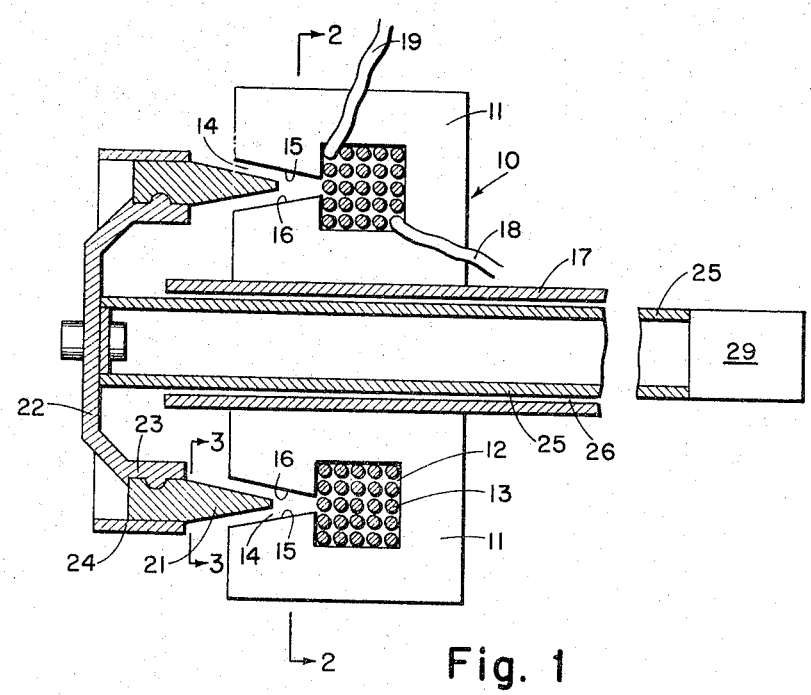
FIG. 1 is a cross-section of a linear actuator taken along the line of reciprocating motion.
Figure 2:
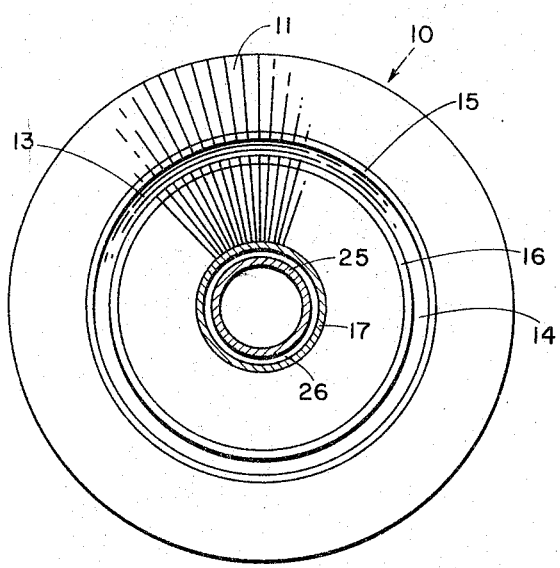
FIG. 2 is a cross-section of the linear actuator of FIG. 1 taken along lines 2—2 of FIG. 1.

One embodiment of the linear actuator of this invention is shown in cross-section in FIG. 1. It will be appreciated that this cross-section was taken along the linear axis of the apparatus and that any load positioned at the end of the moving member will be moved back and forth or from right to left, as illustrated in FIG. 1. The apparatus in FIG. 1 is seen to have a stationary member 10 which is formed of a number of laminations 11. (See FIG. 2.) The laminas or sections in the continuous circular stationary member 10 of FIGS. 1 and 2 are seen to be formed in the shape of thin radial members 11 which vary in thickness with radius. These laminas are laminated by the known techniques such as coating with lacquer, heating and pressing. The purpose of laminating the stationary member is to minimize the generation of eddy currents in accordance of general practice.

Returning now to FIG. 1, it will be seen that the stationary member 10 of FIGS. 1 and 2 is in a toroid form and within it is an annular recess 12 in which are positioned copper wires 13 serving as the coil which has connecting wires 18 and 19. The stationary member has a circular groove 14 which is seen in FIG. 1 to have a trapezoidal cross-section defined by outer inclined wall 15 and inner inclined wall 16. As will be described subsequently, the groove or gaps 14 may have other configurations. However, in many cases it is the preferred configuration. The stationary member 10 is mounted in a suitable stationary mounting member 17 which is hollow and provides for the movement of the reciprocating member therein.

The moving member or armature 21 is so designed as to reciprocate within the gap 14 and it is designed to bear a specific relationship to the gap.

The force developed by the stator on the armature of such a variable-reluctance actuator is given by $$F = \frac{\phi^2}{2} \frac{dR}{dx} \quad (1)$$

in which

F is force, $\phi$ is the instantaneous value of magnetic flux carried by the stator and $dR/dx$ is the gradient of reluctance, R in the direction of the force, F, as armature position, $x$ is varied.

The flux developed in such a device is given by $$e = \frac{d\phi}{dt} + ri \quad (2)$$

in which $e$ is the instantaneous value of applied voltage, $d\phi/dt$ is the instantaneous rate of change of stator flux,
N is the number of current carrying turns in the stator winding,
$r$ is the resistance of the stator winding, and
$i$ is the instantaneous value of current carried by the stator winding.

Finally, $i$, $\phi$ and R are related by the definition of reluctance, $$Ni = \phi R \quad (3)$$

In a typical case, the characteristics of the reciprocating motion $x(t)$, the forces with which the load reacts to that motion, $F(x)$, and the temporal characteristics of the applied voltages, $e(t)$, will all be determined by the constraints of the particular application. For instance, $x$ may be the sinusodial motion of a piston and the actuator armature in resonance with a spring, $F(x)$ may be the force developed by a gas being compressed by that piston, and $e(t)$ may be a square-wave of alternating voltage applied to the actuator winding and having an alternating frequency of half the frequency of reciprocation.

These equations provide a basis for calculating $dR/dx$, R, and $\phi$ for all values of $x$ during the reciprocating motion, for any chosen values of N and $r$. Typically, the procedure is graphical and iterative. But typically, it is desirable to keep copper losses small, and as a first step, at least, the ohmic voltage drop, $ri$, can be ignored. Then $$\phi = \frac{1}{N} \int e \, dt \quad (4)$$

and $$\frac{dR}{dx} = 2N^2 \frac{F}{[\int e \, dt]^2} \quad (5)$$

Because, typically, F is a two-valued function of $x$, the phase relationship between excitation and reciprocation is chosen such that single values of $dR/dx$ for each value of $x$ will most clearly approximate a solution to Equation 5. Then, a choice of N fixes both $\phi$ and $dR/dx$ for all values of $x$. Larger values of N lead to smaller values of $\phi$ and thus to smaller stator iron cross-section required to carry the peak flux, but at the expense of requiring larger values of $dR/dx$. These larger values of $dR/dx$ require relatively larger values of moving iron, and thus of accelerating forces for a given operating frequency.

Another design choice available is the minimum value of R upon which must be superimposed the increments of R corresponding to the calculated values of $dR/dx$. Larger values of $R_{min}$ lead to reduced radial forces for a given radial asymmetry of armature relative to stator, but at the expense of reduced electrical power factor drawn by the actuator.

A negligible ohmic drop can be achieved by providing sufficient copper cross-section in the coil, at the expense of overall actuator weight, but with the compensation of high electrical power efficiency. If weight constraints impose non-negligible ohmic voltage drops, an iterative design calculation is required in which the foregoing procedure is followed to establish trial values of N, R, and $\phi$, from which values of $i$ can be calculated using Equation 3. Then, with a chosen value of $r$, $e(t)$ in (4) and (5) is replaced by $e(t) - ri(t)$, and the balance of the calculation is iteratively repeated until satisfactory convergence is realized.

When the required $R(x)$ has been established by the procedure outlined above, the geometry of the air-gap region between armature and stator is designed, by well-established procedures, so that reluctance as a function of armature displacement satisfies that requirement.

The moving member is symmetrically disposed about the line of reciprocation and thus the moving member operates along a line relative to the stationary member which corresponds to the loci of the maximum reluctance to achieve zero reluctance gradients and therefore zero force normal to the desired line of motion.

Figure 3:
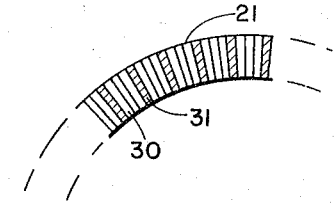
FIG. 3 is a fragmentary cross-section of the moving member, or armature taken along lines 3—3 of FIG. 1.

This moving member 21 is also of a laminated structure as illustrated in the fragmentary cross-section of FIG. 3 to impede eddy current development. In this case, laminas of a non-magnetic material, such as aluminum, are periodically spaced between the soft magnetic iron laminas. Thus, as illustrated in FIG. 3, an aluminum lamina 31 is placed between every three iron laminas 30. The purpose of these aluminum laminas is to impede the passage of flux circumferentially through the moving member thus minimizing reluctance gradients in the radial direction which attend radial displacement of the moving member from the previously identified loci of maximum reluctance and zero reluctance gradient. In this way radial forces are minimized even when the line of reciprocating motion departs slightly from the axis of symmetry or when the structure is not perfectly symmetrical.

In FIG. 1 it will be seen that the moving member 21 is mounted on an end mounting piece 22 which, through a suitable flange 23 and an annular ring support 24, is attached to the wedge-shaped moving member 21. A linear support shaft 25 is affixed to the end-support 22 and rotates within the hollow stationary support member 17. If the moving member is rotated as well as reciprocated, the annular space 26 between the two supports 17 and 25 may serve as the annular ring for developing a self-pressurized gas bearing. Alternatively there may be provided a high-pressure fluid source communicating with the annular space 26 which can supply high-pressure fluid for a pressurized gas bearing. Where gas bearings are not used then other well-known bearing means may be used to support the moving member. Shaft 25 can serve as a connecting rod to a load 29.

Figure 1A:
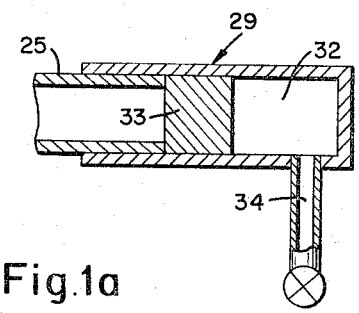
FIG. 1a is a cross-section through a typical load associated with the linear actuator of this invention.

The load will normally be some combination of elastic, inertial and dissipative effects such as, for example, an expansible fluid within a variable volume chamber 32 acted upon by a piston 33 attached to shaft 25 (see FIG. 1a). Assuming that a piston is operating within a suitable chamber, it may be shown that, for example, if a compressed fluid is introduced through a valve-controlled conduit 34 into the chamber, in its expansion it will do work and in turn will provide a force source, thus making the linear actuator of the invention a generator. On the other hand, if the piston must operate on low-pressure fluid to compress it, then the low-pressure fluid will supply a force load and with the introduction of periodic current to the stationary member, the linear actuator will be caused to reciprocate and serve as a motor.

The periodic electric current supplied to the stationary member may be either alternating current or pulsed direct current. Thus, the term "periodic electrical current" will be used to include both pulsed direct current and alternating current. The one requirement for the current supplied is that it vary in a periodic manner to meet the requirements previously set forth.

Many modifications are possible in the design and construction of the linear actuator of this invention and some of these which are typical, are illustrated in FIGS. 4–11.

Figure 4:
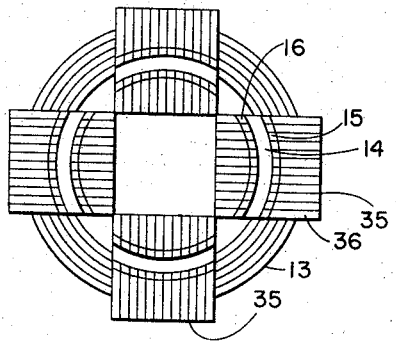
FIGS. 4 and 5 are top plan and side elevational views respectively, of a modification of the stationary member of FIG. 1.
Figure 5:
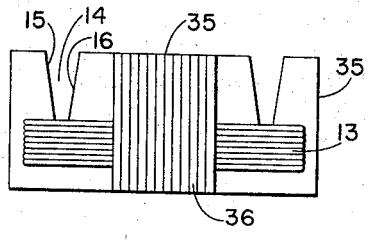

FIGS. 4 and 5, which are top plan and side elevational views, respectively, of a modification of the stationary member of the actuating device, illustrate the fact that the gap does not need to be continuous, and further that the laminas making up the laminated stationary member can be constructed with the same thickness throughout. This in turn eliminates the need of forming the radial members 11 (FIG. 2) with a thickness gradient and hence reduces manufacturing costs. Thus, the stationary member of FIGS. 4 and 5 is seen to be formed of four discontinuous separate laminated pieces 35 which are made up of laminas 36 which are of equal thickness throughout, thus making these elements easier to construct. A gap 14 is machined in each piece and is also discontinuous, being broken by the unoccupied portions between the individual discontinuous members 35 making up the stationary member. In the modification shown in FIGS. 4 and 5, the coil 13 is wound in a suitable recess in each of the individual members 35 and is partly exposed.

Figure 6:
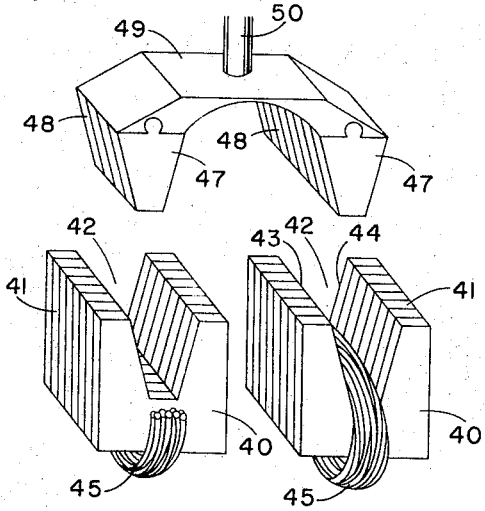
FIG. 6 is an extended perspective view of a linear actuator constructed in accordance with this invention which is not adapted for rotation.

It will be appreciated that the linear actuators of FIGS. 1, 4, and 5 are also suitable for rotation, as will be discussed below in connection with FIGS. 12 and 13. However, it may not be necessary to rotate the linear actuator, and an easily constructed design for an actuator which does not rotate is illustrated in FIG. 6. This is a perspective view, somewhat extended, and it will be appreciated that the moving member, which is the upper part of the figure, is normally positioned somewhat further down, so that the armature pieces reciprocate within the gaps of the stationary member. In the linear actuator of FIG. 6, the stationary member is made up of two diametrically opposed individual components 40 which again are constructed of a multiple of laminas. It is, of course, possible to use any even number of these components 40 so long as they are symmetrically disposed about the line of reciprocation. In this case, the gap need not be of a circular or annular configuration, but may be cut or machined as trough-like grooves 42, defined by the inner inclined side 43 and the outer inclined side 44. In this modification, the coil 45 is wound around each gap as illustrated, that on the lefthand side being broken away to show the bottom portion of the gap in the stationary member 40. Alternatively, the components 40 may have a common coil as in FIG. 4. The moving member 47 is likewise made up of a number of laminas 48 and is supported by means of a suitable support 49 which then in turn is mounted to a shaft 50 which is directly connected to a load such as discussed in connection with FIG. 1.

Figure 9:
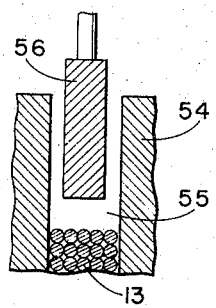
FIGS. 9–11 illustrate modifications in the configuration of the gap between the moving and the stationary members.
Figure 10:
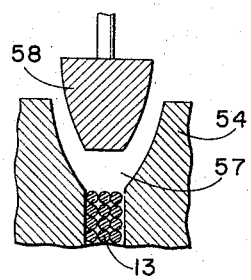
Figure 11:
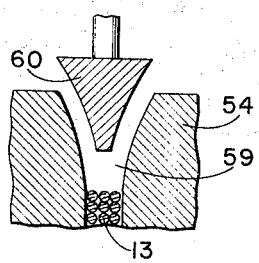

The gaps of FIGS. 1, 5, and 6 have been shown to be of a trapezoidal cross-section. However, this is not necessary, and they may assume a variety of other configurations, three of which are illustrated in FIGS. 9–11 as examples of possible configurations. It is to be understood that these do not represent all of the gaps and moving member designs, but are only illustrative of a few of those which are suitable for various loads, operational conditions, etc. The purpose of the gap configuration is to insure that the force developed by variations in reluctance, as the position of the moving member varies relative to the stationary member, is in accordance with the principles previously described. Thus, the gap may be designed for any operating conditions. Under any circumstance, it should be so shaped that the gradient of reluctance at each point in the stroke is such that the electromagnetic force wave form versus time is appropriate to the desired motion wave form versus time for the load given a predetermined electrical excitation wave form versus time and the force characteristics of the load. Thus there is an optimum design for any gap and moving member for any particular use to which the linear actuator is to be put.

Returning now to FIGS. 9–11 it will be seen that the gap 55 in stationary member 54 in FIG. 9 is a rectangular shape, as is also the cross-section of the moving member 56. In FIG. 10, the gap 57 assumes a configuration somewhat similar to a trapezoid except that the two sides which converge to form the bottom of the path are concave. The moving member 58 is of similar configuration. Finally, in FIG. 11, gap 59 may also be considered to be of a modified trapezoid in which the sides are convex and the moving member 60 corresponds to this configuration.

Figure 7:
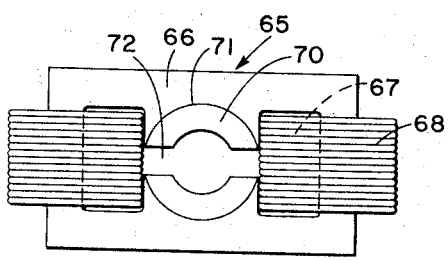
FIGS. 7 and 8 are top plan and side elevational views, respectively, of another modification of the moving and stationary members of this invention.
Figure 8:
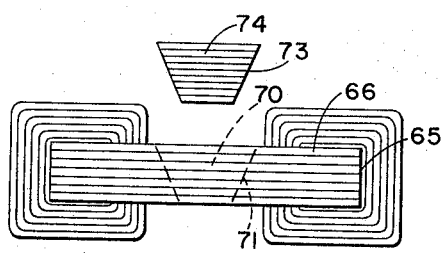

The stationary members of FIGS. 1, 2, 4 and 5 had annular gaps and moving members which were in effect annular rings designed to move back and forth within these gaps. However, the stationary member may define a circular gap and the moving member may itself be a circular member as illustrated in FIGS. 7 and 8, which are to plan and side elevational views, respectively. In the modification of FIGS. 7 and 8, the stationary member 65 is seen to be formed of a number of laminas 66 which are laminated in the direction shown and which have suitable holes cut in them to form a suitable opening 67 through which the coil 68 may be wound. Each lamination 66 has cut into it a circular hole which increases in diameter from lamination to lamination to define in the over-all stationary member a gap 70 of the shape of a truncated cone, as illustrated by the dotted lines in FIG. 8. The sides of the cone are removed to prevent flux shorting in the region 72 shown in FIG. 7. In like manner, the moving member 73 is made up of laminations 74 which have radii increasing from bottom to top in the orientation illustrated thus also giving the moving member a corresponding truncated cone configuration to fit into the gap 70. As in the case of the apparatus of FIGS. 4, 5, and 6 that of FIGS. 7 and 8 lends itself readily to simple construction.

In many applications it will be desirable to include means for rotating the reciprocating member and thus to synchronize the two motions of reciprocation and rotation in order to provide, for example, a valving system for a piston moving within a chamber having fluid introduced and withdrawn therefrom. An application for this type of reciprocating rotating actuator in a fluid apparatus, which may be a compressor, expander or refrigerator, is described in detail in a copending application, Ser. No. 363,740 filed Apr. 30, 1964, U.S. Patent No. 3,274,795, filed in the names of Arthur A. Fowle, Theodore P. Heuchling, Richard E. Kronauer, Allen Latham, Jr., and Charles A. Schulte.

Figure 12:
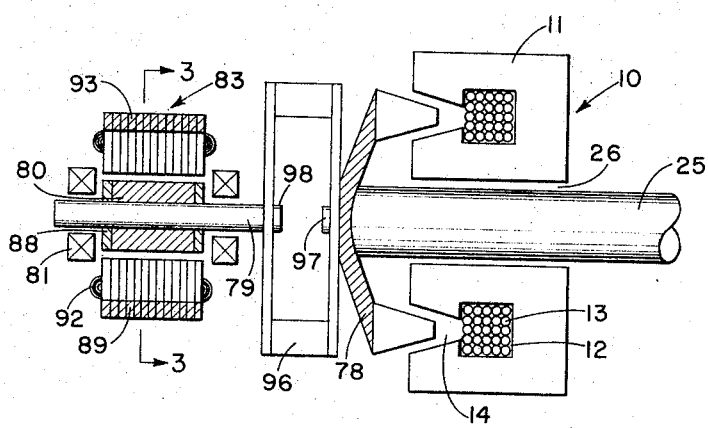
FIG. 12 is a side elevational view, partly in cross-section, of an actuator constructed in accordance with this invention showing means for rotating in conjunction with means for reciprocating.
Figure 13:
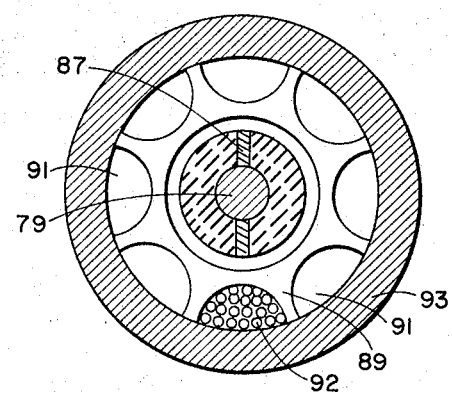
FIG. 13 is a cross-sectional view along lines 12—12 of the rotating means of the apparatus of FIG. 12.

The coupling of rotating means to the linear actuator of this invention is illustrated in FIGS. 12 and 13 and will seem to be accomplished through the use of an elastic member. In these figures, like numbers refer to like elements. In the previous figures for purposes of illustration, the embodiment of the linear actuator of FIG. 1 is used. However, it is to be understood that other constructions of stationary members such as those illustrated in FIGS. 4, 5, 7 and 8 may also be employed.

In the modification of FIG. 12, the moving or reciprocating member 21 is mounted on a suitable support 78. The rotating means comprises a rotor 80, along with its attendant shaft 79, and a stator generally indicated by the numeral 83. Suitable bearings 81 are provided to support shaft 79 and between the stator and rotor is an annular gap 84.

The details of the construction of the rotor suitable for synchronous operation such as for slide valve operation are shown in FIG. 13. It will be seen from the cross-section of FIG. 13 rotor 80 has soft copper strips 87, the purpose of which is to increase the reluctance to flux flow through the rotor normal to the plane of the strip. The rotor may also have copper end strips 88 shown in cross-section in FIG. 12. These end strips 88 are affixed to the rotor to facilitate the flow of induced currents in the rotor during acceleration. The stator 83 is constructed of laminations 89 which have axial grooves 91 cut into them, the purpose of the grooves being to provide necessary recesses for winding the coil 92 of the stator. The stator is then completed by a sleeve 93 which slips around the coils and forms an enclosure for the coil.

If the rotation means is used only for the generation of gas bearing and synchronizing of the two motions is not required, then any rotary actuator may be used. However, for synchronous rotating-reciprocating motions the rotational actuator, as illustrated in FIGS. 12 and 13 must be a synchronous motor of either the variable reluctance or permanent magnetic type, and it is electrically excited in the synchronism with the linear actuator in order to produce rotation and reciprocation with a prescribed phase relationship between them as in the case of a piston and cylinder incorporating slide valves in which the phase relationship is employed to time the valve operation properly. Either the variable reluctance or the permanent magnet type motors may be conveniently designed for induction starting.

In FIG. 12 it will be seen that the reciprocating member, as represented by shaft 25, is connected to the shaft 79 of the rotor of the rotating means by means of spring 96 through suitable connecting means 97 and 98. Spring 96 in this case is used as an example of a suitable elastic member. It permits reciprocating of the shaft 25, and hence a load associated with it, without reciprocating the shaft 79. Under some conditions a direct connection between shafts 25 and 79 could be made but this then would mean that shaft 79 would also undergo reciprocating motion. In addition, the use of the elastic member to join the rotating and reciprocating actuators of the device of this invention has the advantage of providing, at least in part, the necessary acceleration forces to the load with which it resonates, thus requiring that the reciprocating actuator develops only the working forces required by the load which is acting thereon or in which the load is exerting force.

It will be appreciated that the actuator previously described develops a pulsating force in one direction, and that therefore reciprocating motion depends upon appropriate reaction forces and energy storage in the load such as shown in FIG. 1a coupled to the actuator. In actuators where this feature represents an undesirable limitation, two actuators such as those described may be employed back to back, or alternatively, two stationary members may act in opposite directions on a single moving member with their exciting currents appropriately phased relative to one another. The latter arrangement is shown in FIG. 14.

Figure 14:
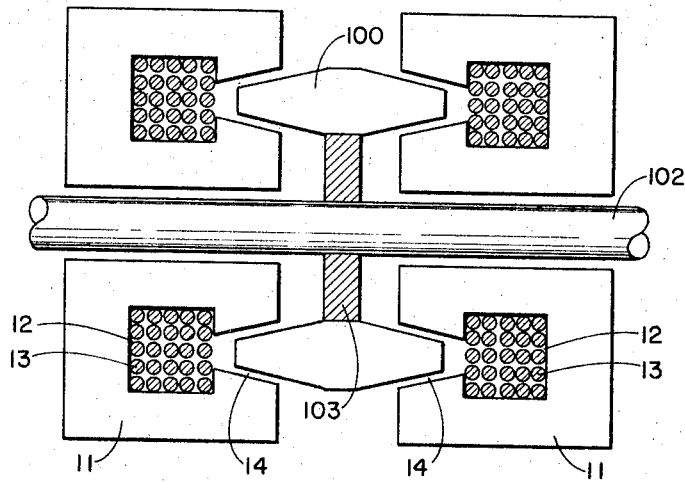
FIG. 14 is a modification of the apparatus showing two stationary members with a single moving member.

In the actuator of FIG. 14 two stationary members 11 are axially aligned and the two recesses 14 which are to form the gaps are axially opposed to each other. The moving member 100 is so formed as to be capable of reciprocating linearly between the opposed recesses 14. In the form shown in FIG. 14, this moving member is attached to a reciprocating shaft 102 through a radial support member 103. Shaft 102 may, of course, be rotated to provide a rotating motion as well as a reciprocating motion to a load (not shown) positioned at one or both of its ends. The two stationary members and halves of the moving member do not necessarily have to be mirror images of each other.

It will be apparent from the foregoing description and drawings that there is provided a novel direct linear actuator which is adaptable to many uses, some of which have long existed and some of which have only recently become evident. By design and construction the direct linear actuator of this invention overcomes many of the difficulties heretofore encountered in apparatus of this type. The direct linear actuator of this invention can be constructed with operational characteristics which are designed for handling different types of loads and is flexible in that it can serve as either a motor or generator. Finally, the linear actuator of this invention lends itself readily to synchonous simultaneous rotary motion and therefore to the use of this actuator with slide valves.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

We claim:

1. An actuator adapted to effect directly a reciprocating linear motion, comprising in combination
   (a) a stationary member having a central opening and defining a recess of substantially trapezoidal cross-section, said stationary member being formed of a plurality of laminas parallel to the direction of reciprocation and being adapted to receive periodic electrical current;
   (b) a moving member adapted to reciprocate linearly within said recess of said stationary member and in reciprocating to define a gap between said stationary and said moving members, that portion of said moving member which reciprocates in said recess having a substantially trapezoidal cross-section and formed of laminas of which a minor portion are of a non-magnetic material to impede flux flow in a direction normal to that of the preferred flux flow, said gap being shaped such that the gradient of reluctance operating in conjunction with said periodic electric current imparts a predetermined movement to a load associated wth said moving member, said stationary and moving members being of such construction that the development of eddy currents resulting from said flux and reciprocation is impeded;
   (c) rotating means adapted to rotate said moving member simultaneously with said reciprocating and affixed to said moving member through an elastic member; and
   (d) axial supporting means affixed at one end to said moving member, extending through said central opening of said stationary member and adapted to be coupled to said load at the other end.

2. An actuator in accordance with claim 1 wherein said load is a force load and said actuator is a motor.

3. An actuator in accordance with claim 1 wherein said load is a force source and said actuator is a generator.

4. An actuator in accordance with claim 1 wherein said stationary and moving members are of a circular configuration and said recess and that portion of said moving member which reciprocates in said recess are of an annular ring configuration.

5. An actuator in accordance with claim 1 wherein said rotating means comprises in combination
(a) a stator of laminated construction, the laminas of which are perpendicular to the axis of the reciprocating motion of said moving member; and
(b) a rotor characterized by having a copper strip in a diametral plane adapted to increase the reluctance of said rotor to flux normal to the plane of said copper strip and to conduct induced rotor currents, thus to develop induction torque at such synchronous speeds.

6. An actuator in accordance with claim 5 further characterized by having an annular passage between the wall of said central opening of said stationary member and that portion of said axial support means enclosed by said wall whereby in rotating, said moving member develops a fluid film within said annular passage which serves as a gas bearing.

7. An actuator adapted to effect directly a reciprocating linear motion, comprising in combination
(a) two stationary members each of which has a central opening and defines a recess of substantially trapezoidal cross-section, said stationary members being formed of a plurality of laminas parallel to the direction of reciprocation and being adapted to receive periodic electrical current;
(b) a moving member having diametrically opposed armatures of substantially trapezoidal cross-section and formed of laminas of which a minor portion are of a nonmagnetic material to impede flux flow in a direction normal to that of the preferred flux flow, the opposed armatures being adapted to reciprocate linearly within said recesses of said stationary members and in reciprocating to define gaps between said stationary and said moving members, said gaps being shaped such that the gradient of reluctance operating in conjunction with said periodic electric current imparts a predetermined movement to load means associated with said moving member, said stationary and moving members being of such construction that the development of eddy currents resulting from said reciprocating is impeded; and
(c) axial supporting means affixed centrally to said armatures extending through said central openings of said stationary members and adapted to be coupled to said load means at each end.

8. An actuator in accordance with claim 7 wherein said stationary and moving members are of a circular configuration and said recesses and those portions of said armatures which reciprocate in said recesses are of an annular ring configuration.

References Cited by the Examiner

UNITED STATES PATENTS

| 1,237,181 | 8/1917 | Dodds | 310—112 |
| 2,860,289 | 11/1958 | Verardo | 310—216 X |
| 3,070,024 | 12/1962 | Romberg | 310—18 X |
| 3,168,242 | 2/1965 | Diener | 317—199 X |
| 3,243,620 | 3/1966 | Suhr et al. | 310—162 |

FOREIGN PATENTS 634,360  3/1950  Great Britain.

MILTON O. HIRSHFIELD, *Primary Examiner.*

D. F. DUGGAN, *Assistant Examiner.*